United States Patent Office
3,224,169
Patented Dec. 21, 1965

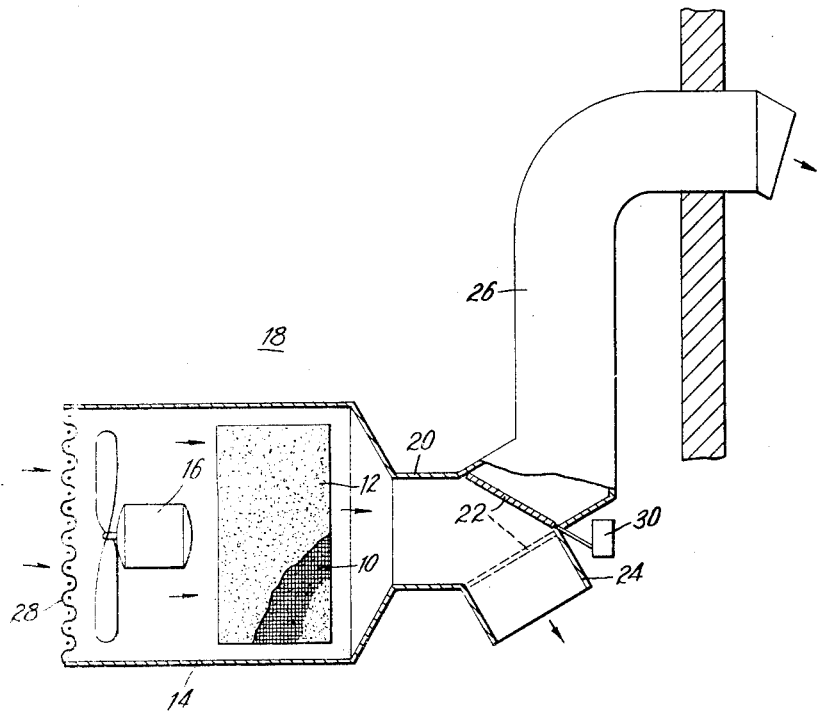

3,224,169
ADSORPTION-TYPE DEHUMIDIFIER
William M. Gaylord, Jr., New Canaan, Conn., assignor to Union Carbide Corporation, a corporation of New York
Filed Dec. 26, 1962, Ser. No. 252,264
2 Claims. (Cl. 55—208)

This application is a continuation-in-part application of United States Serial No. 177,404, filed March 5, 1962 by W. M. Gaylord, Jr., now abandoned.

This invention relates to an adsorption-type dehumidifier, and more particularly, it relates to an improved moisture adsorbing unit for use in such a dehumidifier.

Dehumidifiers which are commercially available fall into two general catagories. The first type may be characterized as refrigeration-type dehumidifiers. This type of dehumidifier employs a compressor-refrigerant system to condense moisture on a cold coil surface. These operate satisfactorily only over a narrow range of temperature and humidity conditions. At low temperatures, i.e., below about 65° F., the dehumidifiers tend to become inoperative due to accumulation of frost on the coil. At high temperatures and humidities, i.e., 95° F., 50% relative humidity, the motor for driving the compressor has a tendency to become overloaded, thereby tripping overload devices if such are provided, and if not, the motor may burn out. In addition, since water in liquid form is discharged by this type of dehumidifier a continuous floor drain must be provided or periodic emptying of a collection vessel is necessary.

The second type of dehumidifier which is available namely, the adsorption-type avoids the above outlined problems. In this type of dehumidifier, the moisture retaining properties of a drying agent are employed. After the drying agent has adsorbed all the moisture it can hold, it is regenerated by vaporizing the adsorbed moisture and exhausting it to an area outside the area being dehumidified.

Normal rating conditions for dehumidifiers are 80° F., and 60% relative humidity. Adsorption-type dehumidifiers actually perform slightly better at 65° F. and 60% relative humidity than at the normal rating conditions, while as explained above, refrigeration-type dehumidifiers tend to freeze up and become inoperative at 65° F. Likewise, under severe operating conditions such as 95° F. and 50% relative humidity, adsorption-type dehumidifiers perform equally as well as at normal conditions with an identical electrical imput. This is in contrast to the overloading encountered with refrigeration-type dehumidifiers. Finally, since adsorption-type dehumidifiers discharge the adsorbed water in a vapor form, no emptying of pans or open floor drains are required.

The prior art adsorption-type dehumidifier employs a bed of silica gel granules for adsorbing the water, and has a nichrome wire heating element buried in the granules for regeneration purposes.

The object of the invention is to provide an improved moisture adsorbing and regenerating unit for use in an adsorption-type dehumidifier which is characterized by higher operating efficiency and more rapid regeneration.

Broadly stated, the object of the invention is accomplished by a moisture adsorption and regeneration unit which comprises one or more electrically conductive heating elements in a sheet form which have bonded thereto by a suitable adhesive a moisture adsorptive substance such as silica gel. Suitable sheet type electrically conductive elements may be fabricated from sheets of graphite cloth and paper type sheets which have been treated to render them electrically conductive.

Electrically conductive graphite in a flexible fabric form has recently become available (Metal Progress, May 1959, pp. 115–116). Sheets of such material are used in the subject unit as both the mechanical support for the silica gel and as means for electrothermally regenerating it.

Examples of electrically conductive paper sheets include Micarta or kraft paper which have been coated with vapor deposited aluminum or an electrically conductive resin coating such as a carbon black or milled graphite flour filled chloride-acetate vinyl copolymer resin. A recently developed electrically conductive paper sheet is disclosed in Chemical Briefs For Industry, October 1958, published by Grasselli Chemicals. This paper is stated to be rendered electrically conductive due to a treatment with colloidal silica and graphite particles. These sheets similarly will support the silica gel and double as the means for electrothermally regenerating it. Any adhesive or cement which maintains an acidic environment is suitable for use with silica gel. Among such materials are epoxy resins, neoprene cements, phenolic adhesives and cyclopentadiene resins.

For purposes of convenience only, the ensuing discussion will be limited to a combination adsorption and regeneration unit wherein one or more sheets of graphite cloth are used as the heating element. It will be readily appreciated that all the advantages accruing from the use of this sheet type heating element will likewise accrue from the use of any of the other electrically conductive sheet type heating elements discussed above.

In order that the invention may be more readily understood, reference will be made to the accompanying drawing wherein the sole figure is a schematic drawing of a dehumidifier system in which the improved adsorption regeneration unit of the invention may be suitably employed.

Referring now to the drawing, a sheet of graphite cloth 10, which has cemented thereto on both sides crystals of silica gel 12, is provided with suitable electrical connections (not shown) and combined in a suitable housing 14 along with a motor driven fan 16. These members which form the basic essential of a dehumidifier system are placed in a space 18 which is to be dehumidified. An air duct 20 which leads from the dehumidifier has two branches separated by a damper 22, namely an outlet 24 which permits dehumidified air to be directed back into the space 18 from which the air was drawn, and a vent 26 which permits the adsorbed moisture to be discharged in vapor form to a space outside the space 18 which is being dehumidified.

The operation of the dehumidifier system is cyclic and consists of two parts, the adsorption portion and the regeneration portion, and the cycle may be controlled by any conventional timer (not shown) which is provided in the electrical circuit. During the adsorption portion of the cycle, humid air from space 18 is drawn into the housing 14 by the fan 16 through a filter screen 28 provided in the housing 14, and it is blown over the moisture adsorbing silica gel 12 thereby becoming dehumidified and finally the dried air is directed back to the space 18 through the oulet 24 by the damper 22 in the duct 20. After a controlled passage of time during which the silica gel has adsorbed moisture, the speed of the fan is automatically slowed and a damper position changing device 30 throws the damper to the regeneration position, shown in dotted line on the drawing. During the regeneration portion of the cycle, the graphite cloth element 10 is heated by passage of an electrical current therethrough. The generated heat vaporizes the moisture which has been adsorbed by the silica gel 12, and the reduced volume of air being drawn by the fan 16 passes over the silica gel 12, picks up the water vapor and carries it outside the space 18 through duct 20 and vent 26 due to the proper positioning of the damper 22.

After passage of a predetermined amount of time, the regeneration portion is complete, and the damper 22 is thrown to the dehumidifying position by the damper control 30, the fan 16 picks up speed, the electricity to the heating element of graphite cloth 10 is discontinued, and the dehumidifying portion of a new cycle is begun.

It will be appreciated that it is necessary to reduce the air flow to a low value during the regeneration portion of a cycle in comparison to the air flow during the adsorption portion of the cycle, otherwise air may be drawn into the space 18 from an outside area thereby defeating the operation of the dehumidifier.

A specific example of the operation of a dehumidifier employing the novel graphite cloth-silica gel unit of the invention is the following:

Eleven sheets of a plain weave graphite cloth, twelve inches by fourteen inches, each sheet of which had the following properties

| | Average |
|---|---|
| [1] Weight, ounces/sq. yd. | 3.0 |
| [1] Gage, inches | 0.012 |
| [1] Count, yarns/inch | |
| Warp | 35 |
| Fill | 31 |
| Filaments/yarn bundle | 480 |
| Filaments diameter, inches | 0.0003 |
| [1] Tensile strength, lbs./in. | |
| Warp | 9.2 |
| Fill | 8.6 |
| Electric resistance at 70° F. ohm/sq. | |
| Warp | 1.1 |
| Fill | 1.2 |
| At 1000° F., warp and fill | 0.87 |
| At 3000° F., warp and fill | 0.41 |

[1] American Society of Testing Materials D39–59.

were connected in series electrically to give a total electrical resistivity of 13 ohms. Both sides of each sheet were coated with grade 01(3–8 mesh) "Davison" silica gel crystals by means of an epoxy resin cement. The total weight of the silica gel crystals was 11.8 pounds. The sheets were assembled into a unit with ½ inch space between each sheet.

A dehumidifier using this adsorption and regeneration unit was placed in a dehumidifier system such as shown in the drawing, along with a voltage dopping resistor in the power supply of the fan such that the full line voltage was applied to the fan during the adsorption portion of a cycle and one-half line voltage during the regeneration portion of a cycle. This dehumidifier system was run in a humidity and temperature controlled room and the following data was obtained:

| | |
|---|---|
| Flow of air during adsorption | 290 cubic feet per minute. |
| Flow of air during regeneration | 55 cubic feet per minute. |
| Cycle length-total time | 45 minutes. |
| Regeneration time | 18 minutes. |
| Adsorption time | 27 minutes. |
| Room temperature | Dry bulb—90° F. wet bulb—79° F.=63% relative humidity. |
| Silica gel temperature | Min. 104° F., max. 153° F. |
| Temperature air vented | Min. 99° F., max. 125° F. |
| Air outside room temperature | Dry bulb—76° F., wet bulb—59° F. |
| Water removed from room | 22.1 pints per 24 hour period. |
| Electrical imput: | |
| Regeneration | 985 watts. |
| Adsorption | 185 watts. |
| Calculated electrical imput | 0.51 k.w.h. per pint water. |

This and other tests have shown that the subject graphite cloth-silica gel dehumidifier-regeneration unit is more efficient and economical than a silica gel-Nichrome wire unit. For example, with 12 pounds of silica gel and 10 square feet of graphite cloth it is possible to match the performance characteristics of a prior art unit which employs approximately 25 pounds of silica gel. In addition, due to the intimate contact between the silica gel and the graphite cloth heating element, the time required for the regeneration of the silica gel can be reduced considerably. This permits the dehumidifier to be used a greater portion of its in-operation-time for the intended purpose of moisture removal from the atmosphere.

The design of the subject unit, i.e., cementing silica gel crystals over the surface area of sheet type heating elements with a suitable adhesive also allows higher air flow rates to be employed than can be used with a Nichrome wire element which is buried in a bed of silica gel crystals. This is primarily due to the fact that in the subject unit, the silica gel crystals are not free to rub against each other and to suffer attrition loss as happens when the gas flow is too great through a loose bed of particles. This higher permissible flow rate, of course, allows for an improved rate of heat and mass transfer between the air and the silica gel.

I claim:

1. For use in an electrically powered dehumidifier system, a combination adsorption and regeneration unit which comprises at least one sheet type heating element which is electrically conductive over its surface area, said heating element being sheets of graphite cloth having a plurality of particles of a moisture adsorptive character secured thereto with a suitable adhesive.

2. The combination adsorption and regeneration unit of claim 1 wherein said particles of a moisture adsorptive character are crystals of silica gel and said suitable adhesive is chosen from the group consisting of epoxy resins, neoprene cements, phenolic adhesives and cyclopentadiene resins.

References Cited by the Examiner

UNITED STATES PATENTS

| | | | |
|---|---|---|---|
| 2,038,071 | 4/1936 | Wilhelm | 55—388 X |
| 2,506,578 | 5/1950 | Case | 55—161 X |
| 2,544,733 | 3/1951 | Shuler | 55—387 |
| 2,629,587 | 2/1953 | Tignor | 55—482 X |
| 2,993,816 | 7/1961 | Blake | 117—227 X |

REUBEN FRIEDMAN, *Primary Examiner.*